United States Patent

[11] 3,554,261

[72] Inventors Henri Mirtain and
 André Devienne, Compiegne, France
[21] Appl. No. 745,278
[22] Filed July 16, 1968
[45] Patented Jan. 12, 1971
[73] Assignee Uniroyal Englebert France S. A.
 Paris, France
 a corporation of France
[32] Priority July 24, 1967
[33] France
[31] 115,427

[54] PNEUMATIC TIRES
 15 Claims, 14 Drawing Figs.
[52] U.S. Cl. ................................................... 152/361
[51] Int. Cl. ...................................................... B60c 9/64
[50] Field of Search .......................................... 152/361,
 359, 360, 358

[56] References Cited
 UNITED STATES PATENTS
2,976,905 3/1961 Beckadolph .................. 152/361
3,095,027 6/1963 Weber .......................... 152/361

Primary Examiner—James B. Marbert
Attorney—Norbert P. Holler

ABSTRACT: Radial ply tires having good vertical flexibility as well as lateral stability even at high speeds are disclosed. The tires are characterized by a sidewall construction in which a radially inward zone in at least one sidewall is reinforced only by the ply structure of the radial carcass itself, and the respective adjacent radially outwardmost sidewall zone contiguous with the tread region of the tire is additionally reinforced by a supplementary ply structure of the carcass extending from the breaker region into the sidewall. In a preferred embodiment, the supplementary ply structure comprises sheet material folded back upon itself, with the folded edge defining the boundary between said sidewall zones. As a refinement of the invention, the respective adjacent radially inwardmost zone of the same sidewall contiguous with the associated bead region is also additionally reinforced by an extended bead turnup section folded back upon itself. The resultant intermediate sidewall zone of limited reinforcement, bounded by the proximate edges of the additional reinforcing plies in the two other zones, is of considerably reduced width with respect to the normal width of a sidewall between the proximate edges of the standard breaker and bead turnup, whereby the tire is somewhat rigidified but retains an optimum degree of flexibility. The sidewall region corresponding to the intermediate zone may also be reduced in thickness.

INVENTORS
HENRI MIRTAIN
ANDRÉ DEVIENNE
BY Robert P. Holler
ATTORNEY

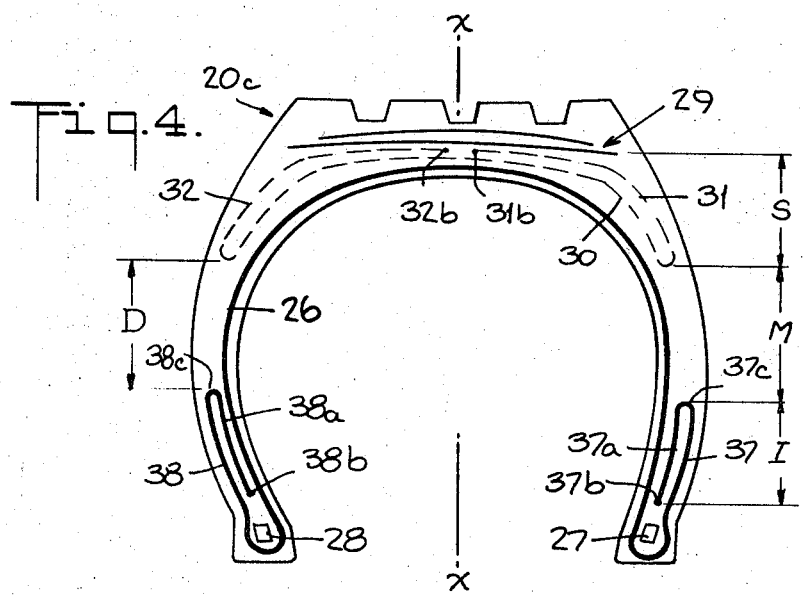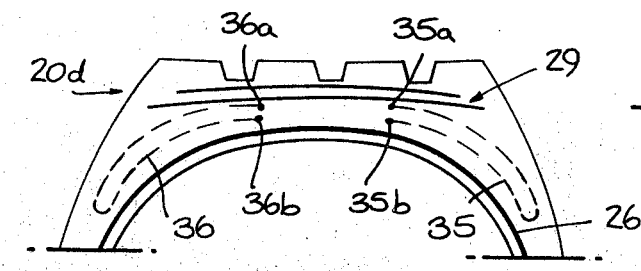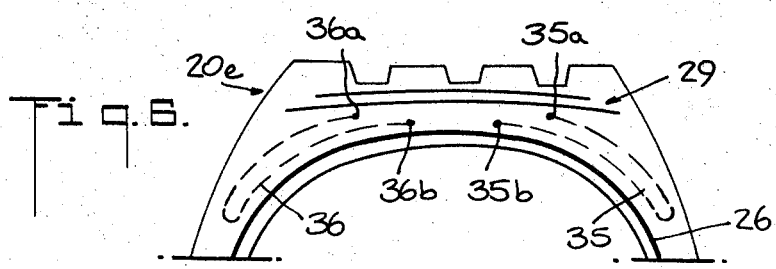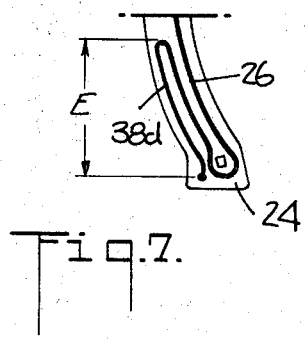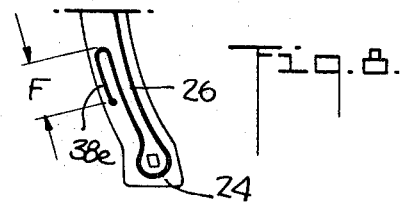

INVENTORS
HENRI MIRTAIN
ANDRÉ DEVIENNE
BY Norbert P. Holler
ATTORNEY

INVENTORS
HENRI MIRTAIN
ANDRÉ DEVIENNE
BY
Norbert P. Holler
ATTORNEY

PNEUMATIC TIRES

The foregoing abstract is not to be taken either as a complete exposition or as a limitation of the present invention, and in order to understand the full nature and extent of the technical disclosure of this application, reference must be had to the following detailed description and the accompanying drawings as well as to the claims.

This invention relates to pneumatic tires for vehicles, and more particularly to the type of tires generally called radial or radial ply tires.

The expressions "radial tires" and "radial ply tires" as commonly used in the pneumatic tire art may be said to include various tire constructions having one or more body or carcass reinforcement plies of weftless cord fabric extending from bead to bead wherein the cords or cables in each ply are substantially radial in orientation. Specifically, in a monopoly radial tire construction, the cords or cables normally have a high bias angle of 90°, i.e. in the unshaped carcass they are disposed perpendicular to the planes of the beads, and in the finished tire in meridian or radial planes of the same which are perpendicular to the equatorial or circumferential center plane of the tire. In a two-ply radial tire construction, the cords or cables in the two body plies are usually oriented at respective oppositely disposed small angles of up to 10° to the perpendicular to the equatorial plane, in which case the respective body plies are said to have oppositely disposed high bias angles of 80° or greater (but less than 90°). In four-ply or heavier radial tire constructions, similar opposed orientation of the cords in successive body plies is usually employed. All of these body or carcass constructions are contemplated within the scope and meaning of the expressions "radial" and "substantially radial" as used herein.

Radial tires also generally have a breaker or belt interposed between the crown region of the carcass and the tread for reinforcing the latter, such breaker being comprised of one or more plies of usually weftless cord fabric the cords or cables of which are made of generally inextensible materials, e.g. metallic wires, glass filaments, polyester filaments, etc. In a monopoly breaker, the cords or cables have a relatively low bias angle of 0°, i.e. they are oriented substantially parallel to the planes of the beads and the equatorial plane or crown centerline of the tire. If the breaker is a multiply structure, similar but opposed low bias orientations of the cords or cables generally at angles ranging up to about 25° or so with respect to the equatorial plane are employed in successive plies.

In respect of radial ply tires, furthermore, it is well known that the relatively thin sidewalls of such tires, i.e. the zones between the breaker and the beads, are characterized by relatively high flexibility, both transversely and vertically, because the cables or the cords of the body ply or plies are disposed in the meridian or radial planes of the tire. On the other hand, the breaker and bead zones of the tire are much more rigid and afford a greater resistance to the stresses which tend to deform them, particularly in the transverse direction. The fact that the sidewall zones are vertically flexible is rather advantageous, in that this flexibility improves the general riding comfort of the vehicle on which such tires are mounted. Because of their transverse flexibility, however, the ordinary radial ply tires have a tendency to impart to the vehicle lateral rocking or yawing movements which give the driver a "-floating" sensation. Especially at high speeds, this sensation is particularly disagreeable, because it becomes more and more difficult to control the vehicle as the speed increases. This phenomenon can probably be attributed to too weak a rigidity of the sidewalls, and the proof of this is that standard bias ply tires the sidewalls of which are more rigid do not cause as great transverse reactions.

It is an important object of the present invention, therefore, to provide a radial tire construction which enables the above disadvantages to be efficaciously avoided.

Another object of the present invention is the provision of an improved radial tire which, while retaining its desirable flexibility in the vertical plane, eliminates the undesirable lateral reactions.

Accordingly, it is a more specific object of the present invention to provide a radial tire having more rigid than usual sidewalls which are also characterized by a zone reinforced only by the radial ply alone so as to retain some flexibility.

The objectives of the present invention are basically achieved by the incorporation, in such a radial tire, of at least one additional ply for the radial carcass in the crown region or breaker zone thereof, such ply or plies extending into the radially outermost or upper zone of at least one of the sidewalls and adhering both to the inner ply of the breaker and to the radial carcass. A further refinement of the invention entails the extension of the bead turnup portions of the radial ply to a substantial degree toward the said upper zone so as to provide an optimum width of an intermediate zone reinforced only by the main ply or plies of the radial carcass itself. Preferably, in the upper and lower sidewall zones, the additional ply or plies and the turnups, respectively, are folded back on themselves so that the possibility of ply separation at the boundaries of the intermediate sidewall zone is substantially minimized. If desired, the thickness of the sidewall over the expanse of the said intermediate zone of the casing may also be reduced.

The foregoing and other objects, characteristics and advantages of the present invention will be more clearly understood from the following detailed description thereof when read in conjunction with the accompanying drawings, in which:

FIGS. 3 and 4 are similar views showing modifications of the tire sidewall constructions according to the present invention;

FIGS. 5 and 6 are similar but fragmentary sectional views of such tires and show other possible arrangements of the reinforcements in the upper sidewall zones of tires according to the present invention;

FIGS. 7 and 8 are similar but fragmentary sectional views of such tires and show other possible arrangements of the reinforcements in the lower sidewall zones of tires according to the present invention;

Figure 1:
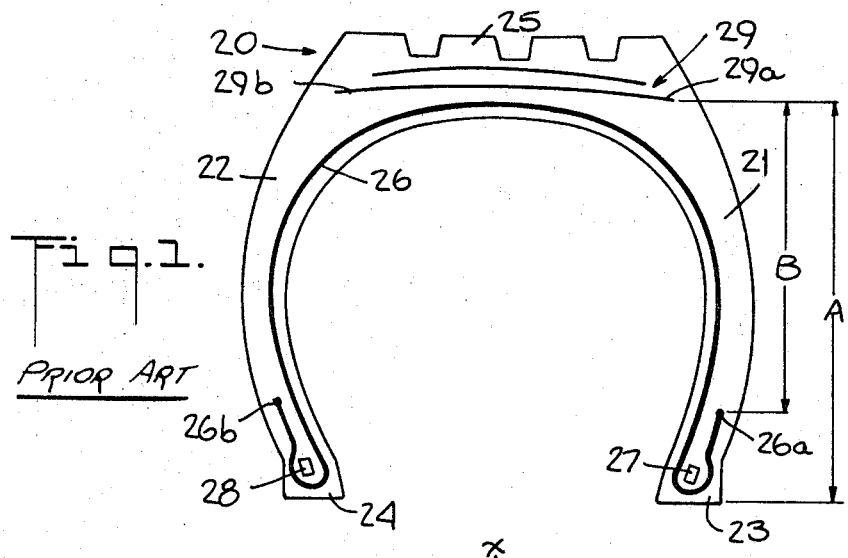
FIG. 1 is a radial section through a standard radial ply tire with a continuous carcass.

Referring now to the drawings in greater detail, the tire 20 shown in FIG. 1 is of the most usual type and comprises sidewalls 21 and 22 terminating at their radially inwardmost ends in beads 23 and 24 and merging at their radially outwardmost ends into a tread 25 defining the road-contacting surface of the tire. In this tire, the carcass or body of the tire is shown as a continuous radial ply structure 26 the opposite end regions of which are turned up around the bead wire bundles or cores 27 and 28 and, as shown at 26a and 26b, extend for a short distance outwardly through the sidewalls 21 and 22. A breaker structure 29, generally coextensive with the tread 25 and extending from one tire shoulder to the other, as shown at 29a and 29b, is interposed between the crown region of the carcass 26 and the tread 25 to reinforce the latter. It will be understood that either the carcass or the breaker structure or both of them may be of either monopoly or multiply construction, and that the cord or cable elements thereof may be made of any suitable natural or synthetic fibers such as nylon, rayon, polyester, metal wire, glass fiber, etc.

In a tire of this type, therefore, the sidewalls 21 and 22 are reinforced only by the radial ply carcass 26 itself over substantially the entire radial height A of the tire. Actually, of course, the bead turnup portions 26a and 26b of the carcass afford some extra reinforcement to a relatively small zone of the sidewalls in the region of the beads 23 and 24, so that the effective height B of minimum reinforcement is somewhat smaller, but the width of this zone is for all practical purposes insufficient to achieve any appreciable reduction in the flexibility of the sidewalls.

Figure 2:
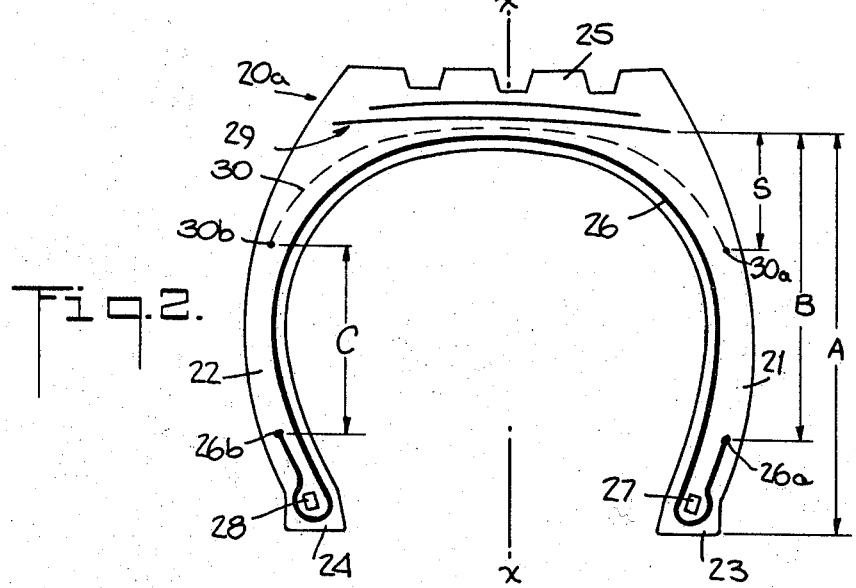
FIG. 2 is a similar sectional view of a radial tire having a sidewall construction according to the present invention

To attain the basic objective of the present invention, i.e. to bring about an appropriate increase in the rigidity of the sidewalls which will be sufficient to enhance the lateral stability of the tire but not to affect the softness of the ride adversely to a marked degree, the tire 20a according to the embodiment of FIG. 2 comprises, in addition to the aforesaid conventional elements, an extra reinforcing ply 30 overlying the carcass 26 in the breaker or crown zone and extending laterally therebeyond for a considerable distance into the radially outermost or upper parts of the sidewalls 21 and 22, terminating in edges 30a and 30b so as to provide an additionally reinforced sidewall zone S. As will be understood, the extra ply 6 also includes cables or cords made of a natural or synthetic fiber such as, for example, nylon, rayon, polyester, etc., these cords or cables, however, being oriented at an angle of between 0 and 60° to the median equatorial plane x–x of the tire.

The effect of the provision of the additionally reinforced zone S, therefore, is to reduce the width of that zone of the sidewalls the sole reinforcement of which is the radial ply carcass, from the values A and B (as in the ordinary radial tires) to the value C, the arrangement preferably being such that C is equal to about one-half B or about one-third A. Even such tires, without more, tend to reduce lateral instability of the vehicle to a large degree, because of the overall lower lateral flexibility of the sidewalls, and, consequently, contribute to a much better behavior of the vehicle on the road.

This behavior may, in accordance with other aspects of the present invention, be improved still further, in the first instance by reinforcing the upper sidewall zone S more than is achieved by the ply 30, and then by simultaneously additionally reinforcing a lower but noncontiguous sidewall zone. Thus, as shown for the tire 20b in FIG. 3, the desired added reinforcement of each of the sidewall zones S is provided by doubling the thickness of the extra reinforcing ply 30 in said zones, as indicated at 31 and 32, preferably by folding its marginal regions back on itself in such a way that the edges 31a and 32a are located in the immediate vicinity of the respective side edges 29a and 29b of the breaker structure 29. This arrangement also has the advantage that the folded-over edges 33 and 34 of the ply 30 tend to protect the tire against ply separations which otherwise might possibly occur in service.

Figure 3:
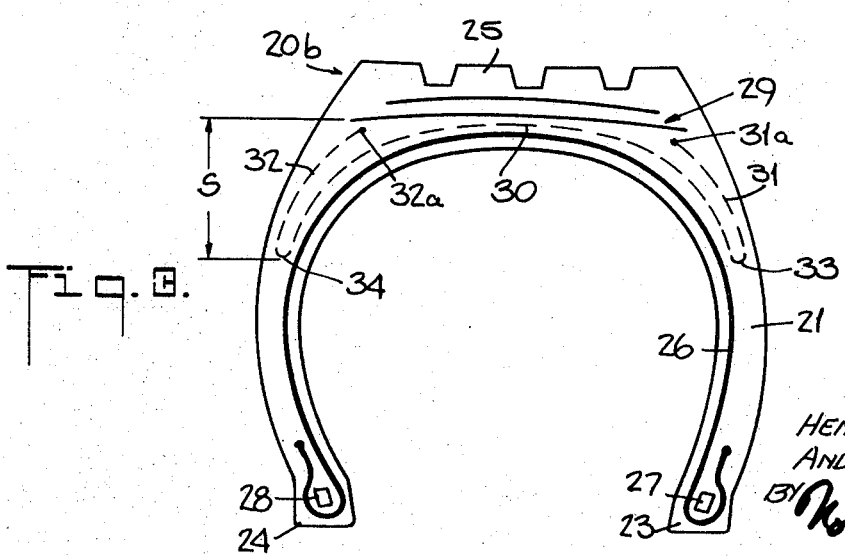

The added reinforcement of the upper sidewall zones achieved in FIG. 3 by folding the ply 30 back over itself may, of course, be effected in different ways, depending on the nature of the stresses which the tire casing is intended to undergo in service. Thus, as shown for the tire 20c in FIG. 4, the folded-back parts 31 and 32 of the ply 30 may be extended in under the breaker 29 so as to dispose their edges 31b and 32b either in the vicinity of the median equatorial plane x–x of the tire, or at any desired one of the positions between those shown in FIGS. 3 and 4. Alternatively, as shown for the tires 20d and 20e in FIGS. 5 and 6, the same effect can be achieved by using, in lieu of a single sheet of material to form the double ply projecting out into the upper sidewall zones, two folded sheets such as 35 and 36 the respective pairs of ends 35a—35b and 36a—36b of which may be disposed under the breaker either in or out of registry with one another.

It should be noted that where the reinforcement of the upper sidewall zones is effected by the use of two folded-back double ply-forming sheets 35 and 36, these need not necessarily be arranged symmetrically with respect to the median equatorial plane of the tire. In fact, in certain cases, e.g. should an asymmetric tire construction be desired, one of these ply structures may even be eliminated.

Although, as previously indicated, the use of radial tires only the upper sidewall zones of which are additionally reinforced by any of the above-mentioned means, contributes to a better road behavior of a vehicle equipped with such tires, this behavior may, if necessary be improved still more by additionally reinforcing the lower or radially inwardmost sidewall zone I, as shown merely by way of example in FIG. 4. Such a reinforcement is advantageously obtained in a simple manner by providing longer than usual bead turnup portions 37 and 38 for the carcass 26 and folding each of these back on itself, for example toward the inside of the casing, in such a way that the interior layers 37a and 38a of the folds terminate close to the bead cores 27 and 28, as indicated at 37b and 38b. The extent to which the end regions of the ply 26 are thus folded back should be such that the distance from each of the folded edges 37c and 38c to the corresponding bead core is greater than the distance (approximately A minus B in FIG. 1) which, in an ordinary casing, separates the bead turnup edges 26a and 26b from the corresponding bead cores.

It will be appreciated, therefore, that by such a construction the lower sidewall zone I of the tire is provided with an extra reinforcement which considerably rigidifies it, while at the same time the width D of the intermediate sidewall zone M, i.e. the zone in which the only reinforcement for the sidewalls is afforded by the radial ply carcass itself, is so reduced as to be markedly less than even the already reduced width C of the comparably reinforced sidewall zones in the tires according to the embodiments of the invention illustrated in FIGS. 2 and 3. Nevertheless, the intermediate sidewall zone M is made sufficiently wide to retain an optimum degree of the initial flexibility of the sidewalls so as to maintain as much of the soft riding qualities of the tires as possible under the circumstances. As before, of course, the provision of folded edges at the boundaries of the upper and lower sidewall zone extra reinforcing plies between which the intermediate zone is defined, has the additional advantage of preventing possible ply separations which might otherwise occur in service.

It will be apparent that the lower zone extra reinforcement effect may be achieved as well by folding the bead turnups toward the outside of the casing rather than toward the inside, as shown at 38d and 38e in FIGS. 7 and 8, respectively. Moreover, the outside layers may extend either the entire distance E separating the fold of the ply from the base of the corresponding bead, as shown in FIG. 7, or only a part F of this distance, for example one-half E, as shown in FIG. 8.

As in the case of the upper sidewall zone reinforcement, the extra reinforcement of the lower sidewall zone I may be provided in only a single sidewall and in any one of the different ways described, and where it is provided on both sidewalls at the same time, this may be done in different ways, for example by different widths of the outside layers of the bead turnups in the different sidewalls.

In accordance with the principles of the present invention, therefore, the extra reinforcement of the upper sidewall zones S and the lower sidewall zones I may be achieved in appropriately predetermined ways by any of the different modifications disclosed herein, which, of course, may be taken in all their technically attainable combinations depending on the desired characteristics of the tire casing according to the invention to be produced.

Figure 9:
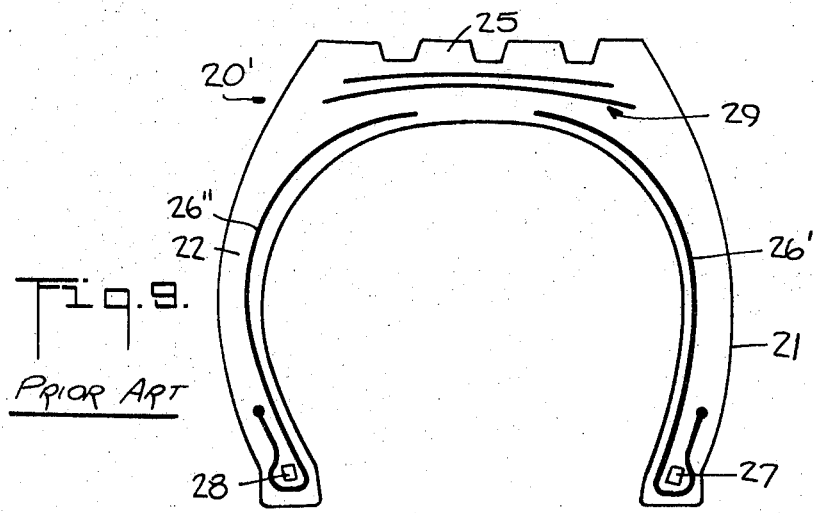
FIG. 9 is a radial section through a standard radial ply tire with a discontinuous carcass.

Referring now to FIG. 9, there are presently known certain equally common types of radial ply tires 20' having a discontinuous carcass composed of two radial sections 26' and 26", each of these being turned up at one edge region around a respective bead core 27 or 28 and terminating at its other edge region under the breaker 29 of the tire, where the last-named edge regions of the ply sections may or may not be overlapped.

Figure 10:
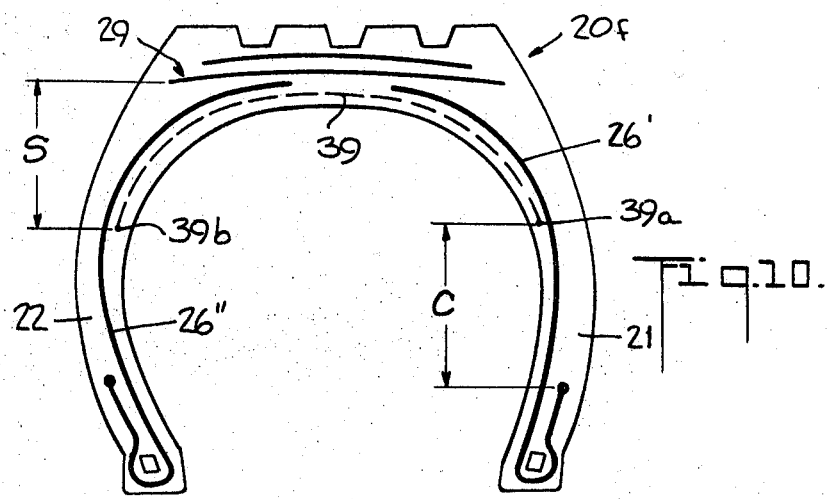
FIGS. 10 and 11 are similar views of radial tires with a discontinuous radial carcass having sidewall constructions according to the present invention.

For tires of this class, the extra reinforcement of the upper sidewall zone S is achieved, in accordance with one aspect of the invention as shown for the tire 20f in FIG. 10, by the provision of an internal reinforcing ply 39 in the crown region of the carcass in bridging relation to the discontinuity between the ply sections. As in the case of the ply 30 (FIG. 2), the ply 39 extends beyond the lateral edges of the breaker 29 into the sidewalls 21 and 22, terminating at 39a and 39b so as to leave a sidewall portion of width, i.e. radial height, C reinforced only by the radial carcass itself. The cord structure and orientation of the ply 39 likewise are the same as those of the ply 30 described above.

Figure 11:
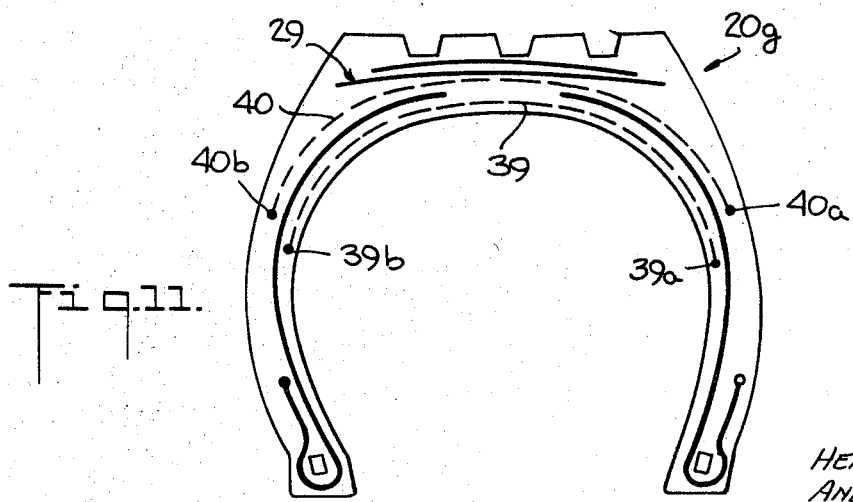
Figure 12:
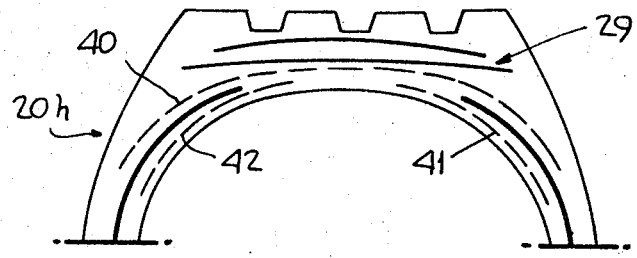
FIGS. 12 and 13 are similar but fragmentary views of modifications of the structures shown in FIGS. 10 and 11.
Figure 13:
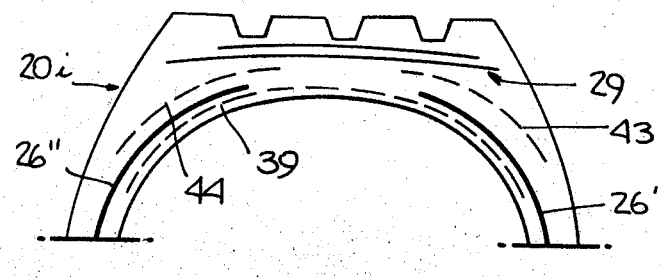

If desired, the extra reinforcement may be supplemented by the addition of yet another ply 40 between the breaker and the ply sections 26′ and 26″ in the region of their discontinuity, as shown for the tire 20g in FIG. 11, the second ply 40 having characteristics similar to those of the ply 30 and terminating in the upper sidewall zones at 40a and 40b in the immediate vicinity of the corresponding ends 39a and 39b of the ply 39. The ply 40 may, if desired or necessary, be folded back on itself in the fashion of the ply 32 shown in FIG. 3. Furthermore, and without any adverse effect on the reinforcement desired, either one of the two plies 39 and 40 may, for example as a possible convenience in building the carcass, be constructed as a discontinuous ply by being built of two separate ply sections, such as 41 and 42 shown for the tire 20h in FIG. 12, or 43 and 44 shown for the tire 20i in FIG. 13.

In the discontinuous carcass types of tires, as before, the additional reinforcing plies for the upper sidewall zones need not be symmetrical. Thus, the extra reinforcement may be provided on only one sidewall, or else be more accentuated on one sidewall than on the other, or even in respective sidewall zones which may not be the same on each side of the tire. Likewise all the modifications of the extra reinforcement of the upper sidewall zones of these discontinuous radial ply carcass tires may be combined with any of the modifications of the extra reinforcement of the lower sidewall zones described previously and illustrated in FIGS. 4, 7 and 8, so as to provide an intermediate sidewall zone M of appropriate height, depending on the desired structural and operating characteristics desired for the tires being produced.

Figure 14:
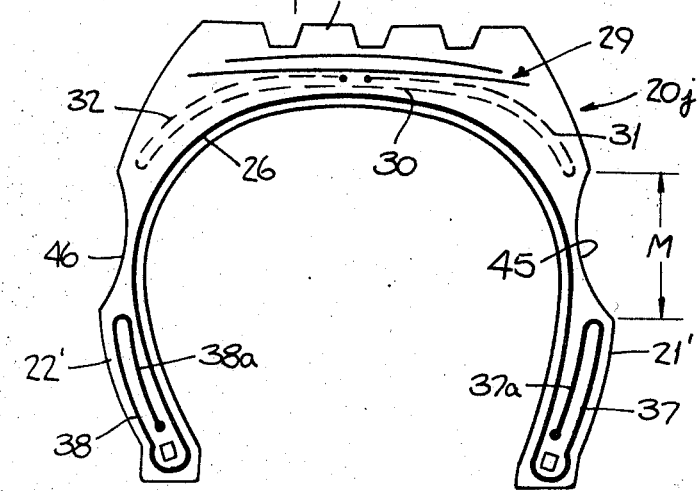
FIG. 14 is a radial section through a radial ply tire having yet another modified sidewall construction according to the present invention.

Referring now to FIG. 14, the tire 20j there shown is essentially the same as the tire 20c (FIG. 4), with the upper and lower sidewall zones being additionally reinforced by the extra reinforcing plies 30—31—32 and 37/37a—38/38a, respectively. The tires differ from one another only in that the sidewalls 21′ and 22′ of the tire 20j are specially molded, during the curing operation, to have generally central portions 45 and 46 of reduced thickness essentially coextensive with the intermediate sidewall zone M. It will be clear, of course, that this sidewall thickness reduction, which makes it possible to increase the vertical flexibility of the casing still more without impairing the lateral rigidity sought for and attained by the addition of the extra reinforcing plies, may be incorporated in any tire constructed in accordance with any of the various embodiments of the present invention.

It will be understood that the foregoing description of preferred embodiments of the present invention is for purposes of illustration only, and that the various structural features and relationships herein disclosed are susceptible to a number of modifications and changes none of which entails any departure from the spirit and scope of the present invention as defined in the hereto appended claims.

We claim:

1. In a pneumatic tire having a radial ply carcass terminating at its radially inwardmost ends in a pair of beads, a tread surrounding the crown region of said carcass, a breaker substantially coextensive in width with said tread interposed between said carcass and said tread for reinforcing the latter, and sidewalls overlying the lateral portions of said carcass from said tread to said beads; the improvement comprising a supplementary tire cord ply structure built into said carcass at least partly under said breaker and extending laterally from said crown region of said carcass into the radially outwardmost zone of at least one of said sidewalls for additionally reinforcing the same, said supplementary ply structure in at least said one radially outwardmost sidewall zone being constituted by at least one single sheet of tire cord material folded back upon itself, with the folded edge defining the radially inwardmost boundary of said radially outwardmost sidewall zone, the cord elements of said supplementary ply structure being made of textile cord material and oriented at an angle between about 0 and 60° to the median equatorial plane of the tire, and the radial width of the portion of said supplementary ply structure within the confines of said radially outwardmost sidewall zone being sufficient to effect a marked reduction in the expanse of the contiguous radially inward sidewall zone reinforced only by said radial ply carcass, thereby to increase the lateral stability of the tire especially at high speed while maintaining optimum vertical flexibility and ride softness.

2. A pneumatic tire according to claim 1, wherein the folded back portion of said sheet extends back toward said breaker at least sufficiently to dispose the free edge of said portion under the lateral edge region of said breaker.

3. A pneumatic tire according to claim 1, wherein the folded back portion of said sheet extends back toward said breaker sufficiently to dispose the free edge of said portion under said breaker and in the vicinity of the crown centerline of said carcass.

4. A pneumatic tire according to claim 1, wherein said supplementary ply structure extends into both of said radially outwardmost sidewall zones.

5. A pneumatic tire according to claim 4, wherein said supplementary ply structure is symmetric with respect to the median equatorial plane of the tire.

6. A pneumatic tire according to claim 4, wherein said supplementary ply structure is asymmetric with respect to the median equatorial plane of the tire.

7. A pneumatic tire according to claim 4, wherein said supplementary ply structure in both said radially outwardmost sidewall zones is constituted by at least one common single sheet of tire cord material the opposite marginal regions of which are folded back upon itself, the folded edges defining the respective boundaries between said radially outwardmost sidewall zones and said radially inward sidewalls zones contiguous thereto.

8. A pneumatic tire according to claim 4, wherein said supplementary ply structure in each of said radially outwardmost sidewall zones is constituted by at least one separate single sheet of tire cord material folded back upon itself, the folded edges defining the respective boundaries between said radially outwardmost sidewall zones and said radially inward sidewall zones contiguous thereto.

9. A pneumatic tire according to claim 1, wherein at least that one of the radially inwardmost sidewall zones on the same side of the tire as said one radially outwardmost sidewall zone is additionally reinforced by the associated bead turnup portion of said radial ply carcass, said turnup portion being extended radially outwardly for a predetermined distance from the bead core and then folded back upon itself to define between its folded edge and the proximate folded edge of said supplementary ply structure a reduced width intermediate sidewall zone reinforced only by said radial ply carcass.

10. A pneumatic tire according to claim 9, wherein said supplementary ply structure extends into both of said radially outwardmost sidewall zones, and both of said radially inwardmost sidewall zones are additionally reinforced by folded over bead turnup portions, the proximate folded edges of said supplementary ply structure and said bead turnup portion in each sidewall defining the boundaries of the respective intermediate sidewall zones.

11. A pneumatic tire according to claim 10, wherein said supplementary ply structure in both said radially outwardmost sidewall zones is constituted by at least one common single sheet of tire cord material the opposite marginal regions of which are folded back upon itself.

12. A pneumatic tire according to claim 10, wherein said supplementary ply structure in each of said radially outwardmost sidewall zones is constituted by at least one separate single sheet of tire cord material folded back upon itself.

13. A pneumatic tire according to claim 9, wherein the folded back part of said bead turnup portion extends back toward the associated bead sufficiently to dispose the free edge of said part in the region of the core of said associated bead.

14. A pneumatic tire according to claim 9, wherein the folded back part of said bead turnup portion extends only partly back toward the region of the core of said associated bead.

15. A pneumatic tire according to claim 9, wherein the respective sidewall of the tire in the region of said intermediate sidewall zone is reduced in thickness.